US012811344B2

(12) United States Patent
Wimmer et al.

(10) Patent No.: US 12,811,344 B2
(45) Date of Patent: Nov. 24, 2026

(54) SECURING DEVICE HAVING AN INDICATOR ELEMENT AND A CONTRASTING ELEMENT

(71) Applicant: Lisa Dräxlmaier GmbH, Vilsbiburg (DE)

(72) Inventors: Stefan Wimmer, Hohenthann (DE); Sebastian Wilhelm, Schmelz (DE); Franziska Neumayer, Geisenhausen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 341 days.

(21) Appl. No.: 18/735,657

(22) Filed: Jun. 6, 2024

(65) Prior Publication Data

US 2024/0413582 A1 Dec. 12, 2024

(30) Foreign Application Priority Data

Jun. 6, 2023 (DE) ......................... 102023114792.7

(51) Int. Cl.
*H01R 13/641* (2006.01)
*H01R 13/629* (2006.01)

(52) U.S. Cl.
CPC ..... *H01R 13/641* (2013.01); *H01R 13/62933* (2013.01)

(58) Field of Classification Search
CPC ............................ H01R 13/641; H01R 13/629
See application file for complete search history.

(56) References Cited

U.S. PATENT DOCUMENTS

| | | | | |
|---|---|---|---|---|
| 9,583,860 | B1 | 2/2017 | Dewitte | |
| 9,748,693 | B1 * | 8/2017 | Exenberger ...... | H01R 13/62955 |
| 2019/0372262 | A1 * | 12/2019 | Christiano ........... | H01R 13/465 |
| 2021/0351538 | A1 | 11/2021 | Yamamoto et al. | |
| 2023/0058780 | A1 * | 2/2023 | Demaratos ......... | G06V 30/1426 |
| 2023/0088130 | A1 * | 3/2023 | Caldwell .......... | G06K 19/06037 439/488 |

FOREIGN PATENT DOCUMENTS

| | | | | |
|---|---|---|---|---|
| DE | 202016008846 U1 | 1/2020 | | |
| WO | WO-2021050499 A1 * | 3/2021 | ........... | H01R 31/065 |
| WO | 2022157238 A1 | 7/2022 | | |
| WO | 2023027750 A1 | 3/2023 | | |
| WO | 2023152107 A1 | 8/2023 | | |

* cited by examiner

*Primary Examiner* — Leah Macchiarolo
(74) *Attorney, Agent, or Firm* — Burris Law, PLLC

(57) ABSTRACT

A securing device for securing a lock of a locking element. The securing device includes a locking element, which can be moved from a first locking position into a second locking position. The locking element produces locking in the second locking position. The securing device further includes an indicator element having an identifying feature for indicating an item of information; and a contrasting element having a contrasting surface which forms a contrast in relation to the identifying feature, such that the identifying feature is discernible when the identifying device is placed above the contrasting surface and is not discernible when the identifying device is not placed above the contrasting surface. In the first locking position, the identifying feature is not placed above the contrasting surface and is not discernible. In the second locking position, the identifying feature is placed above the contrasting surface and is discernible.

14 Claims, 6 Drawing Sheets

SECURING DEVICE HAVING AN INDICATOR ELEMENT AND A CONTRASTING ELEMENT

CROSS-REFERENCE TO RELATED APPLICATIONS

This application claims priority to and the benefit of DE 10 2023 114 792.7 filed on Jun. 6, 2023. The disclosure of the above-referenced application is incorporated herein by reference.

FIELD

The present disclosure relates to a securing device to secure the locking of a locking element.

BACKGROUND

The statements in this section merely provide background information related to the present disclosure and may not constitute prior art.

CPA (connector position assurance) systems are intended to inhibit a connector housing latched to a mating connector housing from being inadvertently detached from the mating connector housing, as can happen for example due to vibrations, temperature-related expansion or shrinkage, pulling on a cable accommodated in the connector housing, or other mechanical effects. For this, the CPA system is responsible for locking the connector to its mating connector, as the last element to be operated. In order to provide secure locking here, it is desired for the final state of the locking to be detected by virtue of a scannable element and for this element to be readable when the CPA system is finally closed.

SUMMARY

This section provides a general summary of the disclosure and is not a comprehensive disclosure of its full scope or all of its features.

The present disclosure relates to a securing device having an indicator element and a contrasting element. The securing device serves to secure the locking of a locking element or for connector position assurance (CPA) and can be used to secure the locking of a connector housing to a mating connector housing. In particular, the present disclosure relates to a CPA system having a contrasting surface.

The present disclosure provides a suitable device which makes it possible to reliably discern if locking is present or not, in particular for connectors for which CPA locking is desired.

The connector may have a high degree of automation in terms of production and fabrication makes the use of a scannable element desired as an assurance function. The present disclosure presented here relates to a securing device including an indicator element having an identifying feature and a contrasting element, wherein a contrast of the identifying feature is modified by the contrasting element and the indicator element can therefore be used as scannable element, in order to provide reliable assurance of the connector production process and make it possible to scan the plug system in the assembled state. The present disclosure may be applied to various plug systems and can be easily adapted from one plug system to another plug system.

The present disclosure provides that the detectability of the indicator element is controlled via the contrast, for example by a white surface on the CPA system, which is slid underneath the feature (identifying feature) to be detected. The element to be detected is on a transparent surface. The element and the underlying surface have the same color or similar colors; the element to be detected is thus not discernible. In general, the element is not discernible because the contrast is too low, for example black to dark grey or the like. A surface with a contrasting color is on the CPA system. By actuating the CPA system, the contrasting surface is slid between the transparent surface and the underlying surface. This produces a contrast, which makes detection possible.

According to a first aspect, the present disclosure provides a securing device for securing the locking of a locking element, wherein the securing device includes the following: a locking element, which can be moved from a first locking position into a second locking position, wherein the locking element produces locking in the second locking position; an indicator element having an identifying feature for indicating an item of information; and a contrasting element having a contrasting surface, which forms a contrast in relation to the identifying feature, with the result that the identifying feature is discernible when the identifying feature is placed above the contrasting surface and is not discernible when the identifying feature is not placed above the contrasting surface; wherein, in the first locking position of the locking element, the identifying feature is not placed above the contrasting surface and therefore is not discernible; and wherein, in the second locking position of the locking element, the identifying feature is placed above the contrasting surface and therefore is discernible.

Upon changing from the first locking position to the second locking position, and vice versa, the identifying feature performs a relative movement in relation to the contrasting surface, with the result that the identifying feature is discernible when the identifying feature is placed above the contrasting surface, and is not discernible when the identifying feature is not placed above the contrasting surface.

The item of information may, for example, indicate whether locking by the locking element is present or not present. However, it may not indicate locking. The identifying feature may contain general items of information. The fact that the identifying feature can be scanned/read only in the end position, i.e. the second locking position, represents the "securing".

Such a securing device affords the technical advantage that it is possible to securely and reliably discern locking. The indicator element can be detected via a scannable element, with the result that it is possible to reliably automatically discern the position of the locking element. This also makes it possible to in particular automatically detect the state of connectors for which CPA locking is desired. The securing device thus meets the standards for CPA locking.

The identifying feature may, for example, be a code, for example a one- or multi-dimensional code, or a pictogram or a symbol or an information display.

According to an example of the securing device, in both of the locking positions of the locking element, the identifying feature is not concealed and always remains visible.

This affords the technical advantage that covering the indicator element having the identifying feature to achieve the desired effect of non-discernibility may be omitted. The modification to the contrast of the identifying feature is already sufficient to make the identifying feature unrecognizable, so that it can no longer be detected or discerned by a scannable element.

According to an example of the securing device, the indicator element has a transparent surface, to which the identifying feature is applied; wherein, in the second locking position of the locking element, the transparent surface with the identifying feature is placed above the contrasting surface, with the result that the identifying feature is discernible.

This affords the technical advantage that the identifying feature can be easily printed onto or otherwise applied to the transparent surface. This makes it possible to easily move the contrasting surface underneath the transparent surface.

According to an example of the securing device, in the first locking position of the locking element, the indicator element having the identifying feature is placed above a contrast-lowering surface, which inhibits the identifying feature from being discerned.

This affords the technical advantage that the contrast-lowering surface correspondingly reduces the contrast of the identifying feature so that discernibility is no longer possible, with the result that it is possible to make a distinction between the “locked” and “unlocked” states.

According to an example of the securing device, when the locking element is being moved from the first locking position into the second locking position, the contrasting surface of the contrasting element moves between the contrast-lowering surface and the identifying feature, with the result that the identifying feature is discernible in the second locking position.

This affords the technical advantage that the contrast of the identifying feature can be easily controlled by actuation of the locking element. When the locking element is actuated by being moved into the second locking position, the contrasting surface is also moved and thus generates the contrast in relation to the identifying feature, with the result that the presence of a locking effect can be reliably discerned.

According to an example of the securing device, the identifying feature includes a code with elements in a first, e.g. light color and elements in a second, e.g. dark color; wherein the elements in the light color are not discernible when the code is placed above the contrast-lowering surface. The code may be a one-dimensional or multi-dimensional code, for example a barcode, a DMC, a QR code, a hologram, etc.

This affords the technical advantage that the indicator element can communicate items of information encoded by the code, for example items of information about the type of locking, the designation of the components, etc. By virtue of the fact that the code includes elements of a first, e.g. light color and elements of a second, e.g. dark color, the contrast can be easily controlled. If the contrast-lowering surface is underneath the code, the elements of the first, e.g. light color are not discernible; if the contrasting surface is underneath the code, both elements are readily discernible.

According to an example of the securing device, both the elements in the first, e.g. light color and the elements in the second, e.g. dark color of the code are discernible when the contrasting surface is between the contrast-lowering surface and the code.

This affords the technical advantage that the code has a strong contrast between the elements of the first, e.g. light color and the elements of the second, e.g. dark color, and therefore it can be easily read by a reading element.

According to an example of the securing device, the identifying feature includes a data matrix code, DMC.

The data matrix code is one of the best known 2D codes and can be used for permanent and robust direct labelling. The DMC is variable in size and thus permits a multiplicity of symbol elements.

According to an example of the securing device, the identifying feature is discernible when the identifying feature is above the contrasting surface. The identifying feature can then be read, for example via a reader, or discerned visually by the user.

This affords the technical advantage that the state of the locking element can be determined securely and reliably via a reader, for example a scanner. This makes it possible to efficiently assure automated mounting of plug systems. Visual discernibility can also be realized.

According to an example of the securing device, the securing device is designed to perform connector position assurance (CPA) to secure the locking of a connector housing to a mating connector housing.

This affords the technical advantage that the state of the CPA system can be reliably detected by virtue of a scannable element, which is readable only when the CPA system is finally closed.

According to an example of the securing device, the securing device also includes: a clamping element for clamping the connector housing into the mating connector housing, wherein the clamping element can be moved from an open clamping-element position, in which the connector housing can be inserted into the mating connector housing, into a closed clamping-element position, in which the connector housing is fastened to the mating connector housing with electrical contact; wherein the locking element is placed on the clamping element and designed to lock or to unlock the clamping element. As already described above, the indicator element may indicate an item of information, for example an item of information about the locking of the clamping element by the locking element or any other item of information.

This affords the technical advantage that the indicator element can reliably indicate the locking of the clamping element, for example a clip, so that the state of the clamping element can be efficiently detected, for example via a scannable element.

According to an example of the securing device, in the closed clamping-element position, the locking element can be moved from the first locking position into the second locking position and is designed, in the second locking position, to lock the clamping element in the closed clamping-element position and, in the first locking position, to unlock the clamping element for a movement into the open clamping-element position.

This affords the technical advantage that a secure connection of the connector housing to the mating connector housing via the clamping element is provided. The securing device thus meets the standards for CPA locking.

According to an example of the securing device, the identifying feature and the contrasting element are placed on the clamping element, for example on a panel of the clamping element; and a movement of the locking element from the first locking position into the second locking position causes the contrasting surface to slide underneath the identifying feature, with the result that the identifying feature is readable in the second locking position.

This affords the technical advantage that the indicator element can reliably and robustly indicate an item of information. In the first locking position, the indicator element is not above the contrasting surface, and therefore there is not enough contrast to discern the identifying feature and it is not possible to discern locking by virtue of a scannable element. In the second locking position, the indicator element is placed above the contrasting surface, and therefore there is enough contrast to discern the identifying feature and it is possible to discern locking by virtue of a scannable element.

According to a second aspect, the present disclosure provides a plug connection having a connector housing and a mating connector housing, which are connected to one another and secured by a securing device according to the first aspect.

According to a third aspect, the present disclosure provides a securing system including a securing device according to the first aspect and a reader, wherein the reader is designed to detect the identifying feature of the indicator element when the locking element is in the second locking position, in order to discern locking.

According to an example of the securing system, the reader is designed to detect the identifying feature of the indicator element only when the locking element is in the second locking position and to detect correct locking only in this position.

DRAWINGS

In order that the disclosure may be well understood, there will now be described various forms thereof, given by way of example, reference being made to the accompanying drawings, in which.

Figure 1:
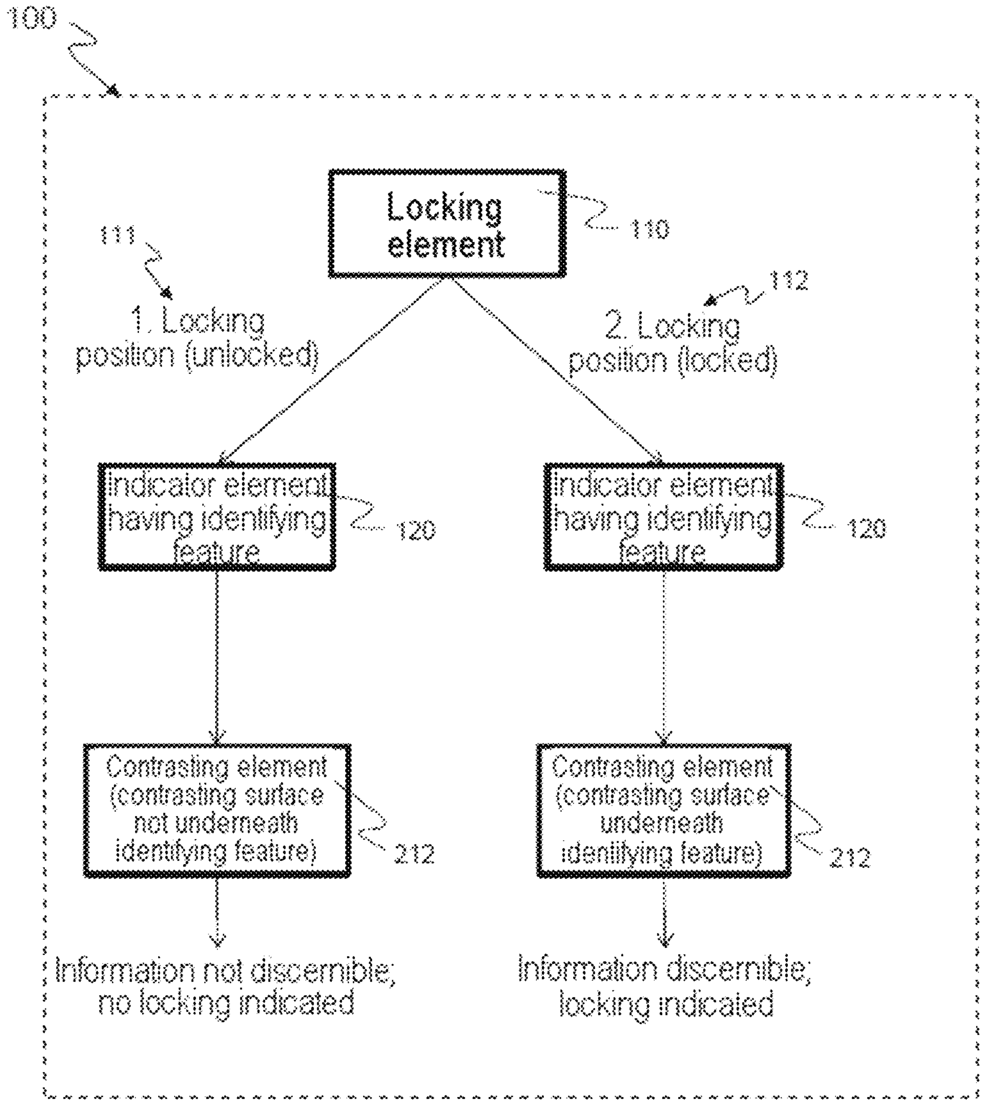
FIG. 1 shows a schematic illustration of the states of a securing device according to the present disclosure.

The figures are merely schematic illustrations and serve only to explain the present disclosure. Elements that are the same or have the same effect are provided with the same reference signs throughout.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the detailed description that follows, reference is made to the accompanying drawings, which form a part thereof and which show, as an illustration, specific examples in which the present disclosure can be carried out. It goes without saying that other examples can also be used and structural or logical changes can be made without departing from the concept of the present disclosure. The detailed description that follows should therefore not be understood in a restrictive sense. It also goes without saying that the features of the various examples described herein can be combined with one another unless specifically stated otherwise.

The aspects and examples are described with reference to the drawings, wherein reference signs that are the same generally relate to the same elements. Numerous specific details are set out for the purposes of explanation in the description that follows in order to provide an in-depth understanding of one or more aspects of the present disclosure. However, it may be obvious to a person skilled in the art that one or more aspects or examples can be implemented with a lesser degree of the specific details. In other cases, known structures and elements are illustrated in a schematic form in order to make it easier to describe one or more aspects or examples. It goes without saying that other examples can be used and structural or logical changes can be made without departing from the concept of the present disclosure.

FIG. 1 shows a schematic illustration of the states of a securing device 100 according to the present disclosure.

The securing device 100 serves to secure the locking of a locking element 110. The securing device 100 includes a locking element 110, an indicator element 120 having an identifying feature 200 (see also FIGS. 2A and 2B), and a contrasting element 212 having a contrasting surface 213.

The locking element 110 can be moved from a first locking position 111 into a second locking position 112 and produces locking in the second locking position 112.

The indicator element 120 having the identifying feature 200 (see FIGS. 2A and 2B) serves to indicate an item of information, for example an item of information about the locking by the locking element 110. However, it is also possible to indicate any other type of information. Whether the item of information is indicated or not indicated is desired for discerning the locking state.

The contrasting surface 213 of the contrasting element 212 forms a contrast in relation to the identifying feature 200, with the result that the identifying feature 200 is discernible when the identifying feature 200 is placed above the contrasting surface 213 and is not discernible when the identifying feature 200 is not placed above the contrasting surface 213.

In this case, in the first locking position 111 of the locking element 110, the identifying feature is not placed above the contrasting surface 213 and therefore is not discernible. In the second locking position 112 of the locking element 110, by contrast, the identifying feature 200 is placed above the contrasting surface 213 and therefore is discernible.

In both of the locking positions 111, 112 of the locking element 110, the identifying feature 200 is not concealed and always remains visible, as set out in more detail below in relation to FIGS. 2A and 2B.

Figure 2A:
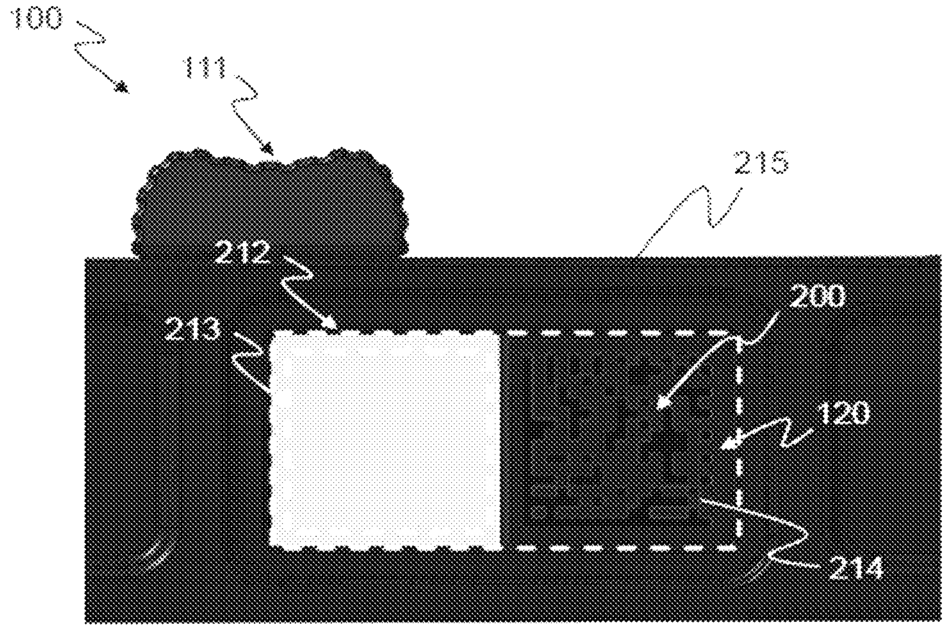
FIG. 2A shows an illustration of a securing device according to the present disclosure as per one example in the first locking position, in which the contrasting surface is not underneath the identifying feature.
Figure 2B:
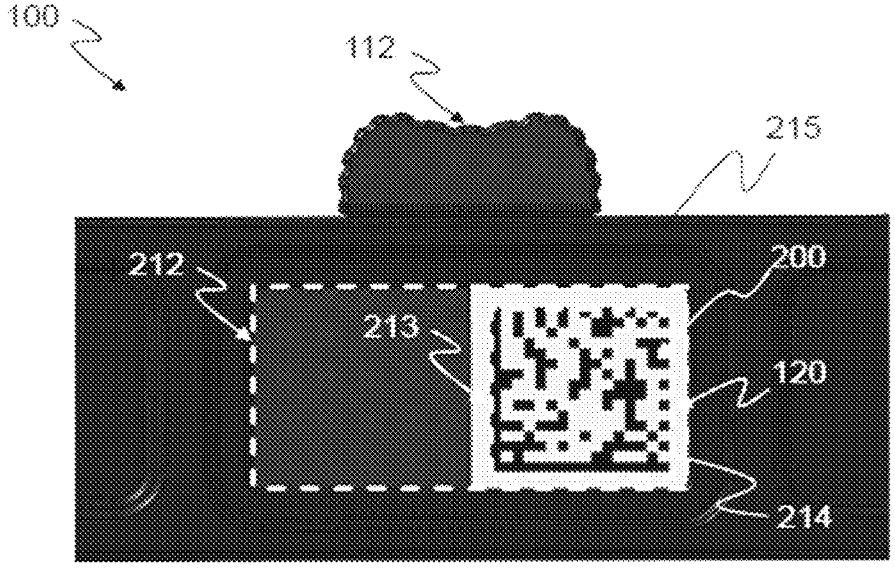
FIG. 2B shows an illustration of the securing device according to the present disclosure from FIG. 2A in the second locking position, in which the contrasting surface is underneath the identifying feature.

An example of the identifying feature 200 and of the contrasting element 212 is illustrated and described in more detail in FIGS. 2A and 2B.

FIGS. 2A and 2B show illustrations of a securing device 100 according to the present disclosure as per an example in the first locking position (FIG. 2A), in which the contrasting surface 213 is not underneath the identifying feature 200, and in the second locking position (FIG. 2B), in which the contrasting surface 213 is underneath the identifying feature 200.

The securing device 100 in FIG. 2A and FIG. 2B corresponds to the securing device described above in relation to FIG. 1, with FIG. 2A and FIG. 2B illustrating the structure of this securing device 100 in more detail.

As already described above in relation to FIG. 1, the securing device 100 serves to secure the locking of a locking element 110. The securing device 100 includes a locking element 110, an indicator element 120 having an identifying feature, and a contrasting element 212, as illustrated in FIGS. 2A and 2B.

The locking element 110 can be moved from a first locking position 111 into a second locking position 112 and produces locking in the second locking position 112. FIG. 2A illustrates the locking element 110 in the first locking position 111; FIG. 2B illustrates the locking element in the second locking position 112.

The indicator element 120 having the identifying feature 200 (see FIGS. 2A and 2B) serves to indicate an item of information, for example an item of information regarding locking or non-locking by the locking element 110, or any other type of information. FIGS. 2A and 2B illustrate the identifying feature as a two-dimensional code with white and black elements or pixels. The 2D code is, for example, a DMC.

The contrasting surface 213 of the contrasting element 212 forms a contrast in relation to the identifying feature 200, with the result that the identifying feature 200 is discernible when the identifying feature 200 is placed above the contrasting surface 213 and is not discernible when the identifying feature 200 is not placed above the contrasting surface 213.

In this case, in the first locking position 111 of the locking element 110 (see FIG. 2A), the identifying feature 200 is not placed above the contrasting surface 213, but to the right of the contrasting surface 213, and therefore is not discernible. In the second locking position 112 of the locking element 110, by contrast, the identifying feature 200 is placed above the contrasting surface 213 and therefore is discernible.

In both of the locking positions 111, 112 of the locking element 110, the identifying feature 200 is not concealed and always remains visible, as shown in FIGS. 2A and 2B.

The indicator element 120 has a transparent surface 214, to which the identifying feature 200, in this case the 2D code, is applied. In the second locking position 112 of the locking element 110, the transparent surface 214 with the identifying feature 200 or the 2D code is placed above the contrasting surface 213, with the result that the identifying feature 200 is discernible, as shown in FIG. 2B.

As illustrated in FIG. 2A, in the first locking position 111 of the locking element 110, the indicator element 120 having the identifying feature 200, in this case the 2D code, is placed above a contrast-lowering surface 215, which inhibits the identifying feature 200 from being discerned. The contrast-lowering surface 215 may be, for example, a dark surface or a black surface, so that the identifying feature 200 or the 2D code above this dark surface does not form enough contrast to be discerned. The contrast-lowering surface 215 lowers the contrast or reduces the contrast to a great enough extent that the identifying feature 200 is no longer discernible.

When the locking element 110 is being moved from the first locking position 111 into the second locking position 112, the contrasting surface 213 (in the example here, the white surface 213) of the contrasting element 212 is caused to move or slide between the contrast-lowering surface 215 (in the example here, the black surface 215) and the identifying feature 200, with the result that the identifying feature 200 is discernible in the second locking position 112 (see FIG. 2B).

The identifying feature 200 may include, for example, a code with elements in a first color (for example a light color, such as white in this example) and elements in a second color (for example a dark color, such as black in this example). The elements in the first color (e.g. white) are not discernible when the identifying feature 200 or code is placed above the contrast-lowering surface 215 (in this example the black surface).

However, both the elements in the first color and the elements in the second color of the identifying feature 200 or code are discernible when the contrasting surface 213 is between the contrast-lowering surface 215 and the identifying feature 200 or two-dimensional code (see FIG. 2B).

As depicted in the example of FIGS. 2A and 2B, the identifying feature 200 or the code may include a data matrix code, DMC. The identifying feature 200 may, for example, also be a barcode or a QR code or a pictogram or any desired symbol.

Such a data matrix code includes or consists, for example, of the following main components:

1) two pairs of solid continuous edges and interrupted edges as boundary lines (finder pattern or position marker). The solid boundary lines serve for delimitation. They are used to align and equalize the data matrix code, so that any reading angle is possible.
2) a peripheral quiet zone. This empty zone surrounds the data matrix code. It does not contain any information or patterns. The width of the quiet zone is at least one gap or line (in one example four times the width, or height, of a module) and is desired for delimitation from other optical image elements of the surrounding area.
3) the corner situated opposite the closed edges. This corner makes it possible to quickly discern the code schemata. In the case of the identifying feature 200 with code scheme ECC, with an even number of lines and gaps, the element in the upper right-hand corner is white. In the case of the other standardized code schemata, with an odd number of lines and gaps, the element in the upper right-hand corner is black.
4) the alignment pattern. This combination in pairs of continuous and interrupted lines in both directions, horizontally and vertically, makes it easier to evaluate the image. They subdivide large data fields into equally sized parts in the case of codes with an edge length of at least 32 modules.
5) the data area. This data area contains the actual binary information in coded form. Depending on the size of the matrix, the number of possible items of information is also defined in this way.

The identifying feature 200, or the code or the DMC, is discernible and can be read, for example by means of a reader or visually by a user, when it is above the contrasting surface 213.

The securing device 100 may be designed to perform connector position assurance (CPA) to secure the locking of a connector housing 400 to a mating connector housing 401, as described in more detail below in relation to FIGS. 3A to 3D.

An example with a CPA system in which the identifying feature 200 is a DMC including black and white pixels, as illustrated in FIGS. 2A and 2B, will be described below. The identifying feature 200 or DMC is only readable when the CPA system is slid underneath it.

The contours of the identifying feature 200 or DMC, which are black in this case, are represented on the transparent surface 214. Since the plane (referred to here as contrast-lowering surface 215) underneath the transparent surface 214 has the same color as the contours of the identifying feature 200 or DMC, the latter is not discernible (see FIG. 2A). There is a white element (here referred to as contrasting surface 213) on the CPA system. It may also have a different color; all that is important is that the contrast in the end position is high enough. By actuating the CPA system, the identifying feature 200 or DMC can be detected in the end position (here referred to as second locking position 112) (see FIG. 2B). The identifying feature 200 or DMC is always visible in this example, that is the identifying feature 200 it is not concealed. The detectability is controlled via the contrast.

The securing device 100, as described above in relation to FIGS. 1 to 2B, and a reader make it possible to implement a securing system which can reliably determine the state of the locking element 110 and transfer this state, for example to a controller, for further processing. Such a securing system includes a securing device 100 as described above and a reader. The reader is designed to detect the identifying feature 200 of the indicator element 120 when the locking element 110 is in the second locking position 112, i.e. when the identifying feature 200 of the indicator element 120 is detectable, in order to thus discern an item of information and therefore locking.

The reader may be designed to detect the identifying feature 200 only when the locking element 110 is in the second locking position 112 and to detect correct locking only in the second locking position 112.

The reader may forward the detected information, for example the read-out 2D code or DMC, to a controller, which then can indicate a fault if the reader detects one and take corresponding steps to control the production or fabrication process.

FIGS. 3A, 3B, 3C and 3D show perspective and plan or top views of a securing device 100 including a locking element 110, an indicator element 120 having an identifying feature, a contrasting element 212, and a clamping element 300 in a closed or open clamping-clip position. The locking element 110 can be moved from the first locking position 111 into the second locking position 112.

The securing device 100 is designed to perform connector position assurance (CPA) to secure the locking of a connector housing 400 to a mating connector housing 401.

In addition to the locking element 110, indicator element 120 and contrasting element 212 that are already described above, the securing device 100 also includes a clamping element 300, for example a clamping clip, for clamping the connector housing 400 into the mating connector housing 401.

The clamping element 300 can be moved from an open clamping-element position (see FIG. 3A), in which the connector housing 400 can be inserted into the mating connector housing 401, into a closed clamping-element position (see FIG. 3B), in which the connector housing 400 is fastened to the mating connector housing 401 with electrical contact.

The locking element 110 is placed on the clamping element 300, for example on a panel or a center piece of the clamping element 300 or clamping clip, as illustrated in FIGS. 3A to 3D, and is designed to lock or to unlock the clamping element 300.

Figure 3A:
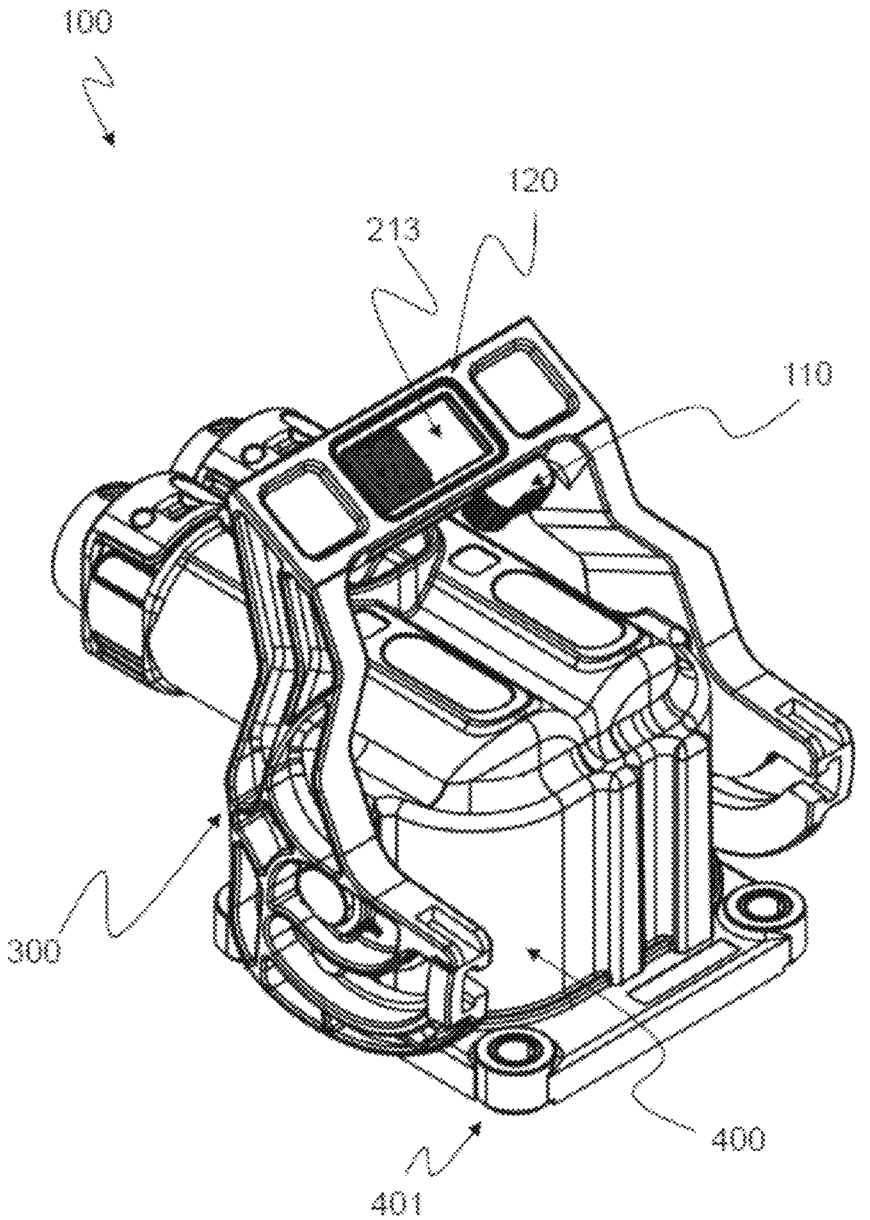
FIG. 3A shows a perspective view of a securing device including a locking element, an indicator element having an identifying feature, a contrasting element and a clamping element in an open clamping-clip position and a non-locked CPA system in the first locking position, in which the contrasting surface is not underneath the identifying feature.

The identifying feature 200 of the indicator element 120 indicates the locking of the clamping element 300 by the locking element 110. The identifying feature 200 of the indicator element 120 is illustrated by way of example in FIGS. 3A to 3D using the 2D code. Locking is indicated in FIGS. 3B and 3D, whereas no locking is indicated in FIGS. 3A and 3C.

Figure 3B:
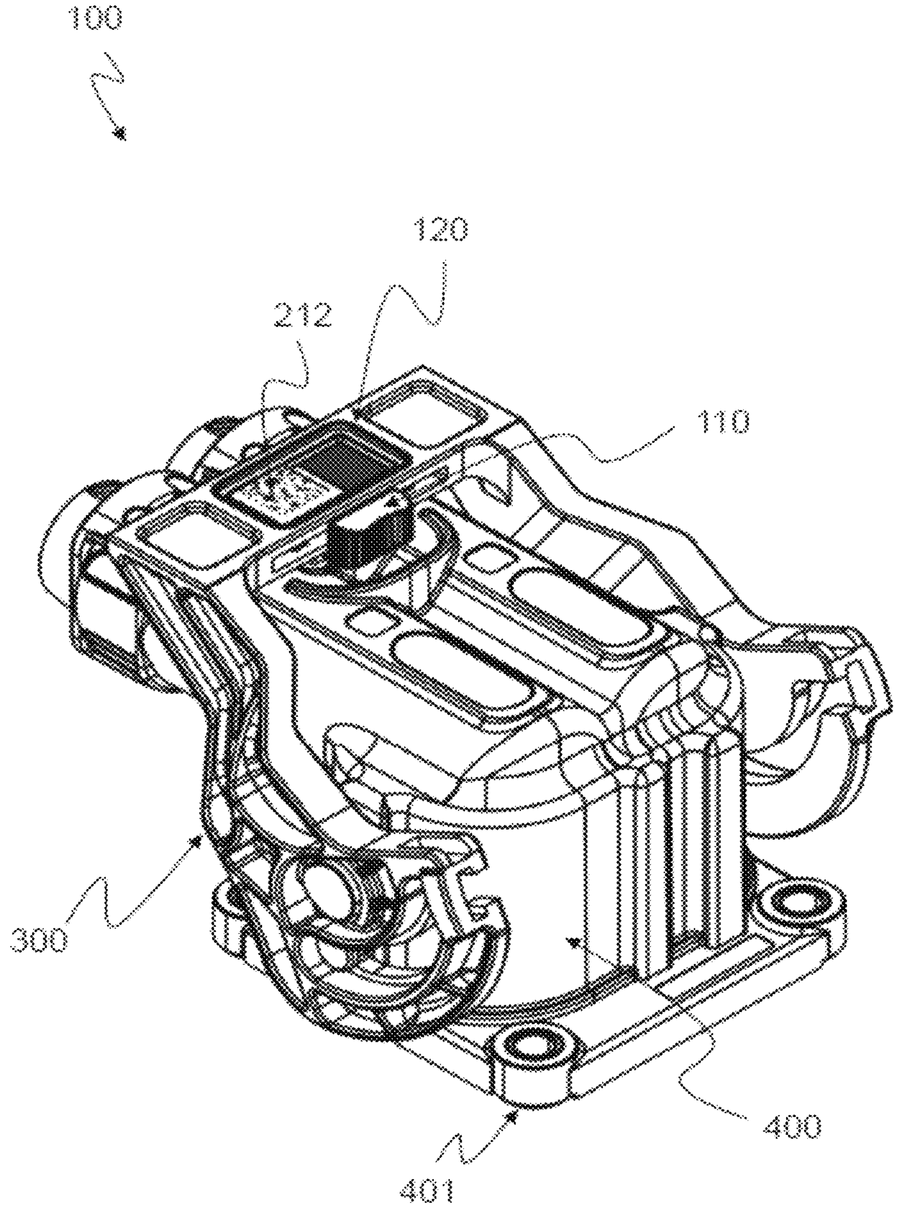
FIG. 3B shows a perspective view of the securing device from FIG. 3A in the second locking position, in which the contrasting surface is underneath the identifying feature.
Figure 3C:
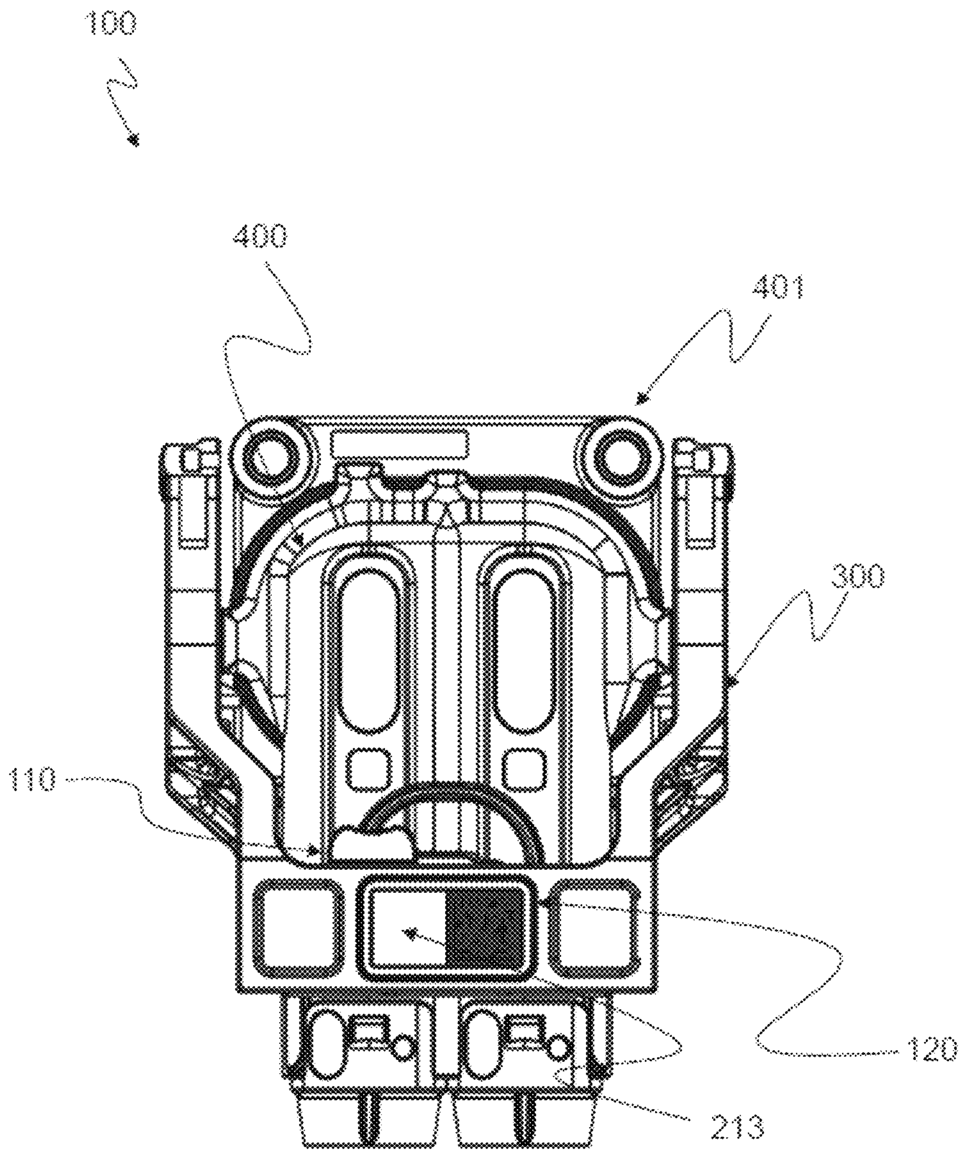
FIG. 3C shows a top view of the securing device from FIG. 3A in the first locking position, in which the contrasting surface is not underneath the identifying feature.
Figure 3D:
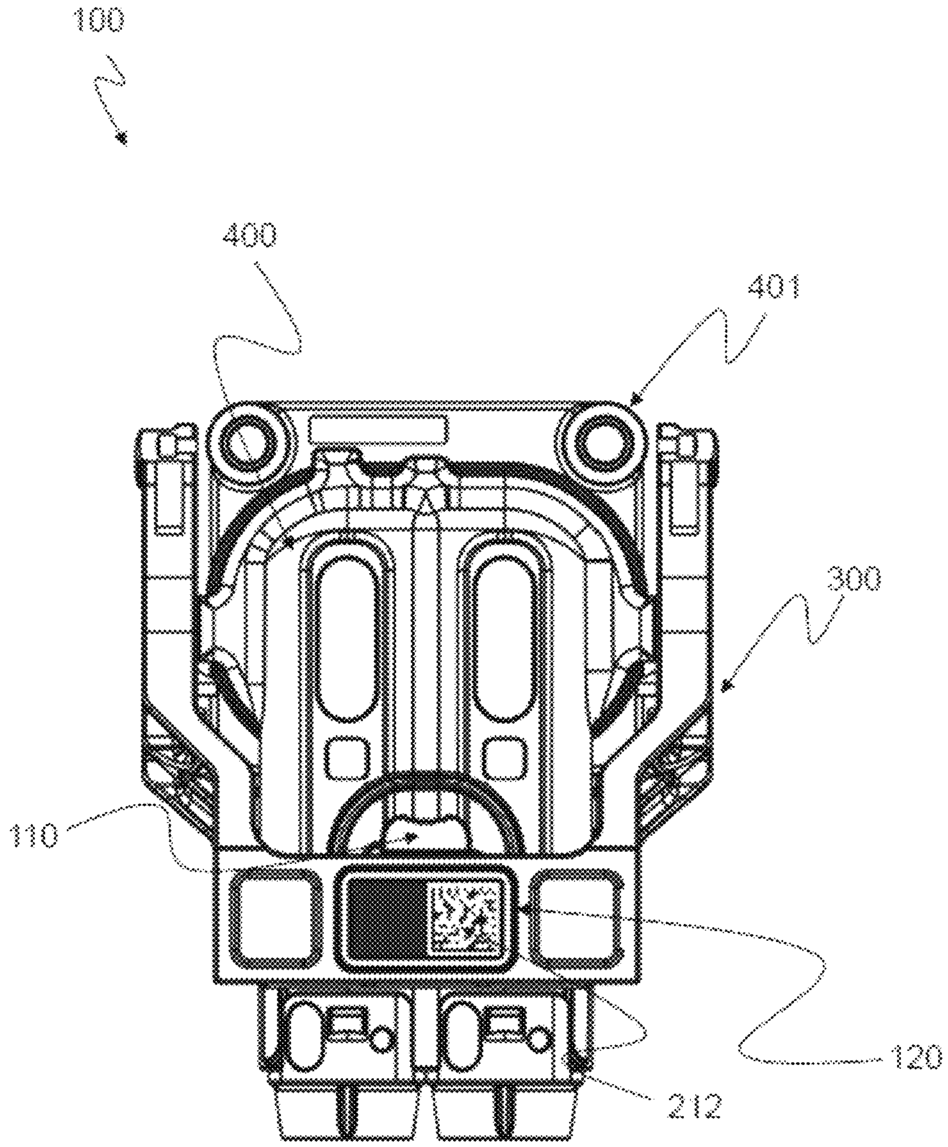
FIG. 3D shows a top view of the securing device from FIG. 3B in the second locking position, in which the contrasting surface is underneath the identifying feature.

In the closed clamping-element position, the locking element 110 can be moved from the first locking position 111 (see FIGS. 3A and 3C) into the second locking position 112 (see FIGS. 3B and 3D). The locking element 110 is designed, in the second locking position 112, to lock the clamping element 300 in the closed clamping-element position and, in the first locking position 111, to unlock the clamping element 300 for a movement into the open clamping-element position.

The indicator element 120 having the identifying feature 200 is placed on the clamping element 300, as can be seen in FIGS. 3A to 3D. The contrasting element 212 is also placed on the clamping element 300, for example on a panel or center piece of the clamping element 300 or clamping clip, as can be seen in FIGS. 3A to 3D.

When the locking element 110 is being moved from the first locking position 111 (FIGS. 3A and 3C) into the second locking position 112 (FIGS. 3B and 3D), the contrasting surface 213 is made to slide underneath the identifying feature 200, or the identifying feature 200 is made to slide above the contrasting surface 213, as illustrated in FIGS. 3B and 3D, with the result that the identifying feature 200 is readable or discernible in the second locking position 112 (FIGS. 3B and 3D).

FIGS. 3A to 3D thus also show a plug connection having a connector housing 400 and a mating connector housing 401, which are connected to one another and secured by the securing device 100 as described above.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A securing device for securing a locking of a locking element, comprising:
- a locking element configured to move from a first locking position into a second locking position, and the locking element is configured to lock in the second locking position;
- an indicator element including an identifying feature configured to indicate an item of information; and
- a contrasting element including a contrasting surface, the contrasting element forms a contrast in relation to the identifying feature, the identifying feature is discernible when the identifying feature is placed above the contrasting surface and the identifying feature is not discernible when the identifying feature is not placed above the contrasting surface, and in the first locking position of the locking element, the identifying feature is not placed above the contrasting surface and is not discernible and in the second locking position of the locking element, the identifying feature is placed above the contrasting surface and is discernible.

2. The securing device according to claim 1, wherein in both the first locking position and the second locking position of the locking element, the identifying feature is not concealed and remains visible.

3. The securing device according to claim 1, wherein the indicator element has a transparent surface, the identifying feature is applied to the transparent surface of the indicator element, and in the second locking position of the locking element, the transparent surface with the identifying feature is placed above the contrasting surface such that the identifying feature is discernible.

4. The securing device according to claim 1, wherein, in the first locking position of the locking element, the indicator element with the identifying feature is placed above a contrast-lowering surface, which inhibits the identifying feature from being discerned.

5. The securing device according to claim 4, wherein, when the locking element is moved from the first locking position into the second locking position, the contrasting surface of the contrasting element moves between the contrast-lowering surface and the identifying feature, such that the identifying feature is discernible in the second locking position.

6. The securing device according to claim 4, wherein the identifying feature includes a code with elements in a first color and elements in a second color, and the elements in the first color are not discernible when the code is placed above the contrast-lowering surface.

7. The securing device according to claim 6, wherein both the elements in the first color and the elements in the second color of the code are discernible when the contrasting surface is between the contrast-lowering surface and the code.

8. The securing device according to claim 1, wherein the identifying feature includes a data matrix code (DMC).

9. The securing device according to claim 1, wherein the identifying feature is discernible when the identifying feature is above the contrasting surface.

10. The securing device according to claim 1, wherein the securing device is configured to perform connector position assurance (CPA) to secure the lock between a connector housing to a mating connector housing.

11. The securing device according to claim 10, further comprising:
- a clamping element configured to clamp the connector housing into the mating connector housing, the clamping element configured to move from an open clamping-element position, in which the connector housing is configured to be inserted into the mating connector housing, into a closed clamping-element position, in which the connector housing is fastened to the mating connector housing with electrical contact; and
- the locking element is placed on the clamping element and is configured to lock or to unlock the clamping element.

12. The securing device according to claim 11, wherein, in the closed clamping-element position, the locking element is configured to move from the first locking position into the second locking position and is configured, in the second locking position, to lock the clamping element in the closed clamping-element position and, in the first locking position, to unlock the clamping element for a movement into the open clamping-element position.

13. The securing device according to claim 12, wherein the identifying feature and the contrasting element are placed on the clamping element and a movement of the locking element from the first locking position into the second locking position is configured to slide the contrasting surface underneath the identifying feature such that the identifying feature is discernible in the second locking position.

14. The securing device according to claim 11, wherein the identifying feature and the contrasting element are placed on the clamping element and a movement of the locking element from the first locking position into the second locking position is configured to slide the contrasting surface underneath the identifying feature such that the identifying feature is discernible in the second locking position.

* * * * *